United States Patent
Zetouna et al.

(10) Patent No.: US 6,199,937 B1
(45) Date of Patent: Mar. 13, 2001

(54) ENERGY ABSORBING POCKET MEMBER

(75) Inventors: Kurtis Zetouna, Waterford; Angela Renee Golovoy, Royal Oak; Irtan Sharif; Kumar Balabhadra, both of Canton, all of MI (US)

(73) Assignee: Visteon Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/241,640

(22) Filed: Feb. 1, 1999

(51) Int. Cl.$^7$ .................................................. B60R 19/30
(52) U.S. Cl. ..................................................... 296/136
(58) Field of Search ............................... 293/121, 133, 293/136

(56) References Cited

U.S. PATENT DOCUMENTS

| | | | |
|---|---|---|---|
| 3,871,636 | * 3/1975 | Boyle | 293/136 X |
| 3,995,901 | * 12/1976 | Filbert, Jr. et al. | 293/136 |
| 4,050,726 | 9/1977 | Hablitzel . | |
| 4,652,032 | * 3/1987 | Smith | 293/133 X |
| 4,901,486 | 2/1990 | Kobori et al. | 188/377 |
| 4,925,224 | * 5/1990 | Smiszek | 293/136 X |
| 4,951,986 | 8/1990 | Hanafusa et al. | 293/120 |
| 5,201,912 | * 4/1993 | Terada et al. | 293/136 X |
| 5,419,416 | 5/1995 | Miyashita et al. | 188/371 |
| 5,609,374 | 3/1997 | Sawae et al. | 293/102 |

FOREIGN PATENT DOCUMENTS

| | | | |
|---|---|---|---|
| 2456416 | * 6/1975 | (DE) | 293/133 |
| 0886295 | 1/1962 | (GB) | 293/136 |
| 6247237 | 9/1994 | (JP) . | |

* cited by examiner

*Primary Examiner*—Dennis H. Pedder
(74) *Attorney, Agent, or Firm*—Larry I. Shelton

(57) ABSTRACT

An energy absorbing pocket member for a motor vehicle includes at least one rail extending longitudinally and a bumper extending laterally across the at least one rail. The energy absorbing pocket member includes a closed end disposed adjacent the bumper and an open end disposed adjacent the at least one rail and having a cavity to allow the energy absorbing member to crush and absorb energy of an impact on the bumper.

13 Claims, 2 Drawing Sheets

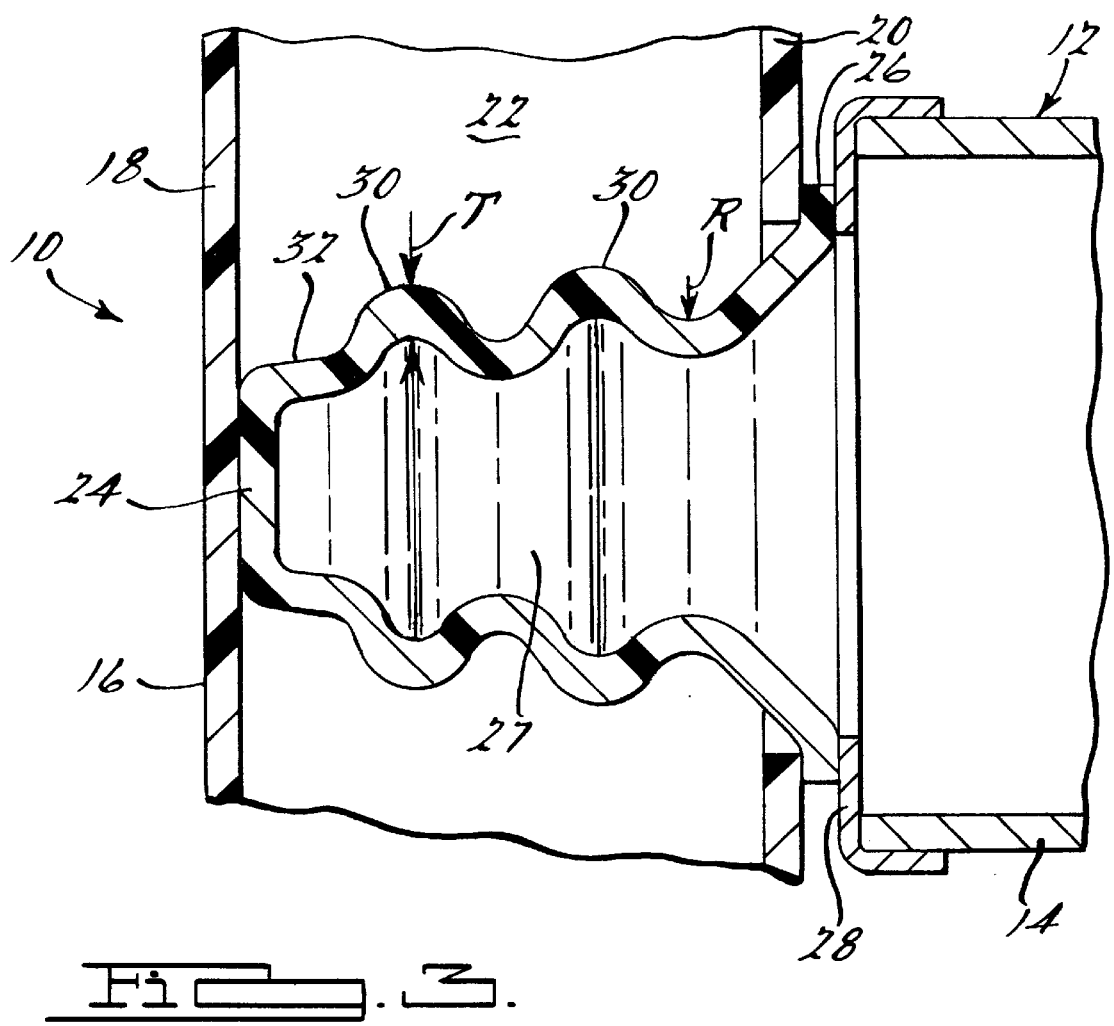

ENERGY ABSORBING POCKET MEMBER

BACKGROUND OF THE INVENTION

1. Field of the Invention

The present invention relates generally to vehicles and, more specifically, to an energy absorbing pocket member for a motor vehicle.

2. Description of the Related Art

It is known to provide front rails and a bumper on motor vehicles. One of the purposes of such rails and bumper is to absorb energy from an impact with an object. To improve the energy absorption, a passive guard member (PGM) is disposed inside a front rail to absorb energy at low speed impacts, i.e., five miles per hour. Another device to improve energy absorption is a molded-in rectangular pocket.

Although the above PGM device has worked well, it suffers from the disadvantage that it is heavy and costly to manufacture. As a result, there is a need in the art to provide an energy absorbing member that absorbs energy and rebounds utilizing a crush initiating shape.

SUMMARY OF THE INVENTION

Accordingly, the present invention is an energy absorbing pocket member for a motor vehicle including at least one rail extending longitudinally and a bumper extending laterally at one end of the at least one rail. The energy absorbing pocket member includes a closed end disposed adjacent the bumper and an open end disposed adjacent the at least one rail and having a cavity to allow the energy absorbing member to crush and absorb energy of an impact on the bumper.

One advantage of the present invention is that an energy absorbing pocket member is provided for a motor vehicle. Another advantage of the present invention is that the energy absorbing pocket member is a crushable pocket member that absorbs energy and rebounds utilizing a crush initiating shape. Yet another advantage of the present invention is that the energy absorbing pocket member is a crushable pocket member that aids in low and high speed vehicle impacts. Still another advantage of the present invention is that the energy absorbing pocket member can be molded-in the same part without external tooling. A further advantage of the present invention is that the energy absorbing pocket member saves cost, is simple to tool and is flexible in geometry.

Other features and advantages of the present invention will be readily appreciated as the same becomes better understood after reading the subsequent description when taken in conjunction with the accompanying drawings.

BRIEF DESCRIPTION OF THE DRAWINGS

FIG. 3 is a fragmentary side elevational view of the energy absorbing pocket member and motor vehicle of FIG. 2.

DESCRIPTION OF THE PREFERRED EMBODIMENT(S)

Figure 1:
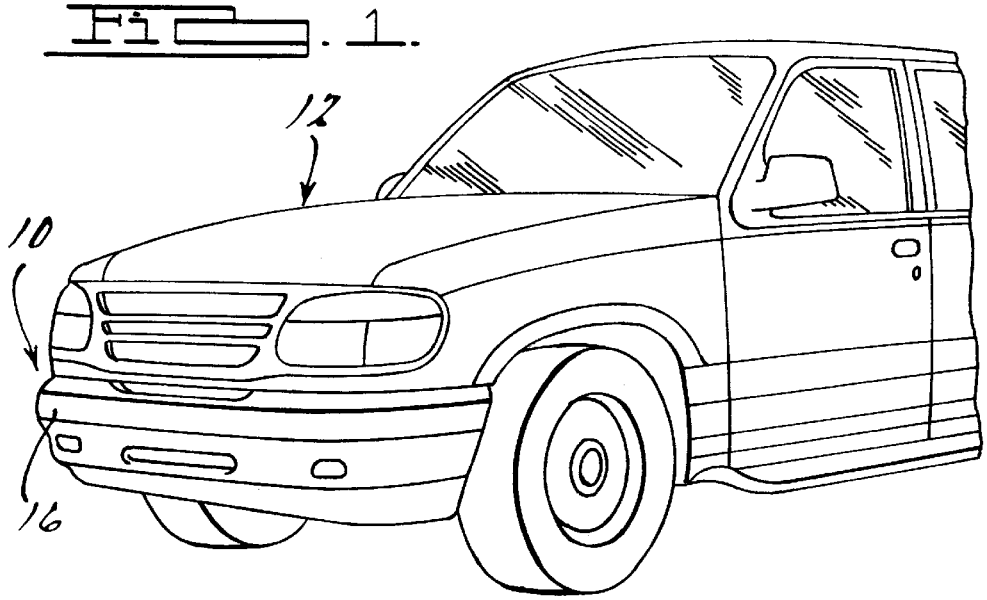
FIG. 1 is a perspective view of an energy absorbing pocket member, according to the present invention, illustrated in operational relationship with a motor vehicle.
Figure 2:
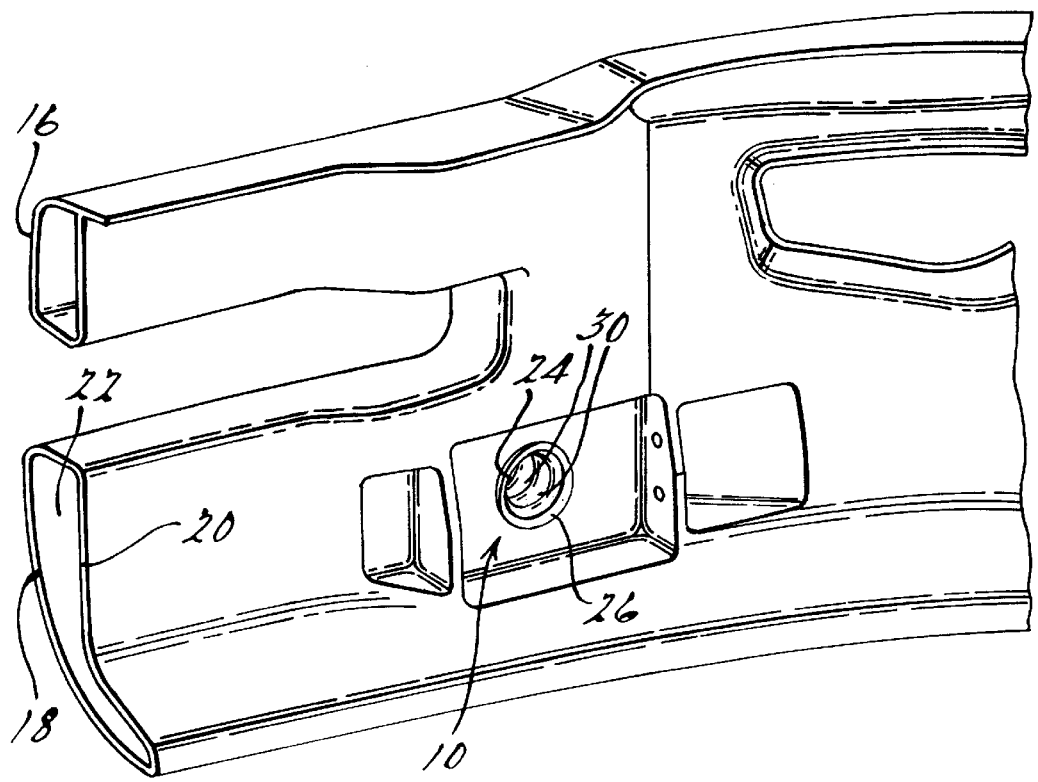
FIG. 2 is a partial rear perspective view of the energy absorbing pocket member and motor vehicle of FIG. 1.

Referring now to the drawings and in particular FIGS. 1 through 3, one embodiment of an energy absorbing pocket member 10, according to the present invention, is shown for a motor vehicle, generally indicated at 12. The motor vehicle 12 includes a pair of front rails 14 (only one illustrated) extending longitudinally and spaced laterally. The front rails 14 are generally tubular and rectangular in cross-sectional shape. The front rails 14 are made of a rigid material such as metal.

The motor vehicle 12 also includes a front bumper 16 operatively connected to vehicle structure and disposed forward of the front rails 14 and extending laterally. The front bumper 16 has a front wall 18 and a rear wall 20 forming a hollow interior 22 with a generally rectangular cross-sectional shape. The front bumper 16 is made of a rigid material such as metal, plastic or a composite material. The energy absorbing pocket member 10 is adapted to mount between the front rails 14 and the front bumper 16 of the motor vehicle 12. It should be appreciated that, except for the energy absorbing pocket member 10, the motor vehicle 12 is conventional and known in the art.

The energy absorbing pocket member 10 extends axially or longitudinally and has a closed end 24 disposed adjacent the bumper 16. The energy absorbing pocket member 10 also has an axial length greater than a transverse or radial width. The energy absorbing pocket member 10 has an open end 26 spaced axially from the closed end 24 to form a cavity 27. The open end 26 is disposed adjacent a closed end 28 of the front rail 14. The energy absorbing pocket member 10 has a generally circular cross-sectional shape. The closed end 24 has a diameter less than a diameter of the open end 26. The energy absorbing pocket member 10 has a generally frusto-conical shape with a generally trapezoidal axial cross-sectional shape. It should be appreciated that the energy absorbing pocket member 10 may have a cross-sectional shape of one of a circle, rectangle or an ellipse.

The energy absorbing pocket member 10 has at least one, preferably a plurality of louvers 30 spaced axially between the closed end 24 and the open end 26. The louvers 30 extend radially outwardly from an outer surface 32 of the energy absorbing pocket member 10. The louvers 30 have a thickness T which may be greater in thickness than the remainder of the energy absorbing pocket member 10 between the louvers 30. The louvers 30 are collapsible around a perimeter of the energy absorbing pocket member 10 similar to an accordion. The louvers 30 have a radii R that can be tuned to crush at different loads to collapse the energy absorbing pocket member 10 and is coordinated with the strength and weight of the front rails 14 or supporting system. The energy absorbency of the energy absorbing pocket member 10 for low speed dynamic impact and high speed dynamic impact can be tuned by varying overall material thickness or shape, such as changing the radii of the louvers 30, changing material type, changing the dimensions of the louvers 30 or even vary the thickness throughout the energy absorbing pocket member 10.

The energy absorbing pocket member 10 is made of a plastic material by conventional processes such as injection molding, blow molding or other forms of molding. Preferably, the energy absorbing pocket member 10 is molded-in the front bumper 16. On a metal front bumper 16, the energy absorbing pocket member 10 can be either insert molded into the metal or molded separately and assembled to the metal front bumper 16.

In operation, the energy absorbing pocket member 10 is disposed in the hollow interior 22 of the front bumper 16 immediately in front of each front rail 14. The energy absorbing pocket member 10 has the closed end 24 disposed adjacent the front wall 18 of the front bumper 16 and the open end 26 disposed adjacent the closed end 28 of the front rail 14. When an object impacts the front bumper 16, the energy absorbing pocket member 10 initiates crush to absorb energy of the impact.

Accordingly, the energy absorbing pocket member 10 adds essentially no weight or cost to the front bumper 16. The energy absorbing pocket member 10 can be integrated with the composite front bumper 16.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. An energy absorbing pocket member for a motor vehicle with at least one rail extending longitudinally and a bumper extending laterally at one end of said at least one rail, said energy absorbing pocket member comprising:

a closed end disposed adjacent the bumper and an open end disposed adjacent the at least one rail and having a plurality of undulations spaced axially between said open end and said closed end and forming a cavity to allow said energy absorbing pocket member to crush and absorb energy of an impact on the bumper, said closed end having a traverse width less than a traverse width of said open end, said undulations having a radial thickness greater than a radial thickness of said energy absorbing pocket member between said undulations, and said energy absorbing pocket member being made of a plastic material and having an axial length greater than a radial width thereof.

2. An energy absorbing pocket member as set forth in claim 1 wherein said energy absorbing pocket member has a generally cylindrical shape.

3. An energy absorbing pocket member as set forth in claim 1 wherein said energy absorbing pocket member has a cross-section of one of a circle, rectangle or ellipse.

4. An energy absorbing pocket member as set forth in claim 1 wherein each of said undulations extend radially outwardly.

5. An energy absorbing assembly for a motor vehicle comprising:

pair of rails extending longitudinally and spaced laterally;

a bumper extending laterally across one end of said rails; and a separate energy absorbing pocket member disposed between each of said rails and said bumper and having a cavity to allow said energy absorbing pocket member to crush and absorb energy of an impact on the bumper, each said energy absorbing pocket member being generally cylindrical in shape and having a closed end disposed adjacent the bumper and an open end disposed adjacent said rails and having a plurality of undulations spaced axially between said open end and said closed end and forming said cavity and being made of a plastic material.

6. An energy absorbing assembly as set forth in claim 5 wherein said energy absorbing pocket member has a generally cylindrical shape.

7. An energy absorbing assembly as set forth in claim 5 wherein said energy absorbing pocket member has a cross-section of one of a circle, rectangle or ellipse.

8. An energy absorbing assembly as set forth in claim 5 wherein each of said undulations extend radially outwardly.

9. An energy absorbing assembly as set forth in claim 5 wherein said undulations have a radial thickness greater that a radial thickness of said energy absorbing pocket member between said undulations.

10. An energy absorbing assembly as set forth in claim 5 wherein said energy absorbing pocket member is molded-in said bumper.

11. An energy absorbing assembly as set forth in claim 5 wherein said closed end has a traverse width less than a traverse width of said open end.

12. An energy absorbing assembly for a motor vehicle comprising:

pair of rails extending longitudinally and spaced laterally;

a bumper extending laterally across one end of said rails; and an energy absorbing pocket member disposed between each of said rails and said bumper and having a cavity to allow said energy absorbing pocket member to crush and absorb energy of an impact on the bumper, said energy absorbing pocket member having a closed end disposed adjacent the bumper and an open end disposed adjacent said rails and having a plurality of undulations spaced axially between said open end and said closed end and forming said cavity; and wherein said energy absorbing pocket member has an axial length greater than a radial width thereof.

13. An energy absorbing assembly for a motor vehicle comprising:

a pair of front rails extending longitudinally and spaced laterally;

a front bumper extending laterally across one end of said front rails; and an energy absorbing pocket member disposed between each of said front rails and said front bumper, said energy absorbing pocket member extending axially and having a closed end disposed adjacent said front bumper and an open end disposed adjacent one of said rails and a plurality of undulations spaced axially between said closed end and said open end and forming a cavity to allow said energy absorbing pocket member to crush and absorb energy of an impact on said bumper, said closed end having a traverse width less than a traverse width of said open end, said undulations having a radial thickness greater than a radial thickness of said energy absorbing pocket member between said undulations, and said energy absorbing pocket member being made of a plastic material and having an axial length greater than a radial width thereof.

* * * * *